United States Patent
Rey et al.

(10) Patent No.: US 6,314,544 B1
(45) Date of Patent: Nov. 6, 2001

(54) CHARACTERIZATION PROCEDURE FOR A VOLTAGE CONVERTER CONNECTED TO A CAPACITIVE CIRCUIT

(75) Inventors: Olivier Rey, Lignières; Antal Banyai, Neuchâtel, both of (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 09/207,603

(22) Filed: Dec. 9, 1998

(30) Foreign Application Priority Data

Dec. 17, 1997 (CH) .................................................. 2898/97

(51) Int. Cl.$^7$ ...................................................... G06F 17/50
(52) U.S. Cl. .............................. 716/4; 324/519; 324/523; 702/141
(58) Field of Search .............................. 703/4; 73/514.18; 716/4; 324/519, 523; 702/140–142

(56) References Cited

U.S. PATENT DOCUMENTS 5,253,510 * 10/1993 Allen et al. ........................ 73/514.18
5,540,095 * 7/1996 Sherman et al. .................. 73/514.18
5,959,871 * 9/1999 Pierzchala et al. ...................... 703/4

FOREIGN PATENT DOCUMENTS 30 13 284   10/1980 (DE) .
42 09 140   9/1992 (DE) .

* cited by examiner

*Primary Examiner*—Matthew Smith
*Assistant Examiner*—Jibreel Speight
(74) *Attorney, Agent, or Firm*—Sughrue, Mion, Zinn, Macpeak & Seas, PLLC

(57) ABSTRACT

The object of the procedure according to the present invention is to characterise a voltage or current converter (20) intended to be connected to a capacitive circuit (32) arranged so as to provide a capacitance difference (C1–C2) to the converter. Said converter is arranged so as to be able to receive the capacitance difference provided by the circuit, and to provide an output voltage (Vo) which is a function of the capacitance difference and a bias signal. This procedure is characterised in that it includes a sequence of steps which consist in varying the bias signal, while keeping the capacitance difference constant and measuring in response the output voltage.

One advantage of such a procedure lies in the fact that it allows the electric performance of the converter to be determined independently of the error link to the capacitance measuring.

6 Claims, 4 Drawing Sheets

US 6,314,544 B1

CHARACTERIZATION PROCEDURE FOR A VOLTAGE CONVERTER CONNECTED TO A CAPACITIVE CIRCUIT

BACKGROUND OF THE INVENTION

The present invention concerns the field of integrated circuits and, more particularly, characterisation procedures for voltage converters connected to a capacitive circuit.

There exist a large variety of sensors as regards their shape, functions, effects and applications.

Within the scope of the detection of a parameter such as acceleration or pressure, a capacitive sensor such as that described hereinafter is commonly used.

FIG. 1 shows a conventional capacitive sensor 1.

Sensor 1 is arranged to be able to measure a parameter such as the ambient pressure or the acceleration undergone by such sensor. For this purpose, sensor 1 includes a support member 5, two plates 11 and 12 which are stationary relative to this support member, and a third plate 13 which is arranged so as to be able to move between the two plates 11 and 13.

An equivalent electric diagram of sensor 1 can be shown by two capacitances C1 and C2 connected in series. In such a diagram, capacitance C1 corresponds to the capacitance of the capacitor formed by plates 11 and 13, and capacitance 13 corresponds to the capacitance of the capacitor formed by plates 12 and 13.

Capacitive sensor 1 is also arranged so as to be able to provide a capacitance difference C1–C2 which is a function of said parameter. For this purpose, sensor C1 includes a connecting terminal 15 to be able to provide such a difference.

The operation of sensor 1 is as follows. Via the effect of said parameter, moving plate 13 moves in sensor 1, and this latter provides in response the capacitance difference C1–C2 which represents the arrangement of the three plates 11 to 13, following said effect.

Within the scope of the detection of a parameter such as pressure or acceleration, such a capacitive sensor is connected to a voltage converter, so that the circuit formed by the sensor and the converter, provides an electric voltage which represents the change in the arameter.

FIG. 2 shows such a known circuit including sensor 1 of FIG. 1, which is connected to a voltage converter 20.

Converter 20 includes two input terminals 201 and 202 and one output terminal 203. Converter 20 is connected and arranged so as to be able to receive, via terminal 201, the capacitance difference C1–C2 provided by sensor 1 and, via terminal 202, a bias voltage vb provided by a constant voltage source 22. Converter 20 is arranged so as to be able to provide, via terminal 203, an output voltage Vo which depends on the capacitance difference C1–C2 and the bias voltage Vb.

It will be noted that bias voltage Vb can be unipolar or bipolar, and referenced relative to the earth potential of the circuit. It will also be recalled that bias voltage Vb is typically used to fix the static gain of the circuit formed by sensor 1 and converter 20 at a predetermined value.

Generally, conventional characterisation procedures for such a converter, rely on the determination of the characteristic feature of output voltage Vo as a function of the capacitance difference C1–C2 and, in particular, the electric performance of this converter.

It will be recalled that the <<electric performance>> of a converter is usually characterised by two electric parameters: the static gain As and the non-linearity coefficient $L_{As}$. It will also be recal dvb that the converter static gain As is equal to $$\frac{Vb}{C1+C2},$$

with reference to FIG. 2, and that non-linearity coefficient $L_{As}$ represents the dispersion of output voltage Vo between the effective values of this voltage and voltage values corresponding to ideal linear properties of the converter.

One difficulty commonly encountered in achieving such characterisation lies in the provision of a plurality of differences in capacitance C1–C2, to measure the change in output voltage Vo as a function of capacitance difference C1–C2.

Indeed, in the event that the converter is connected to a capacitive sensor such as that described in relation to FIG. 1, the variation in the parameter capable of causing a capacitance difference C1–C2 is difficult to control in an industrial manufacturing environment, in particular in semiconductor manufacturing plants, which are subject to concerns as to yield.

In order to answer such concerns, a circuit, whose equivalent electric diagram is close to that of a capacitive sensor, i.e., a circuit which provides an electric signal capable of representing a capacitance difference, is used as capacitive sensor. In the following description, such a circuit is called a <<capacitive circuit>>.

By way of illustration, FIG. 3 shows a conventional capacitive circuit 25, capable of providing five capacitance difference values $C1_i$–$C2_i$ i=1, 2, 3, 4, 5. For this purpose, capacitive circuit 25 comprises connection means 251 and five first capacitors $C1_i$ (i=1, 2, 3, 4, 5) respectively connected in series to five second capacitors $C2_i$ (i=1, 2, 3, 4, 5). Capacitive circuit 25 is arranged so as to be able to establish a connection between one of capacitors $C1_i$, connection means 251 and the associated capacitor C2, so that this circuit provides, via connection means 251, one of the five capacitance difference values $C1_i$–$C2_i$.

One problem which is encountered in the determination of the electric performance of a voltage converter lies in the fact that such determination is unreliable, since the capacitance values are tainted by an intrinsic inaccuracy linked to the tolerance on the components and an extrinsic inaccuracy linked to the connection means of the capacitive circuit, these inaccuracies being all the more inconvenient if one desires to characterise a converter capable of processing low capacitance values.

FIG. 4a shows a curve 40 illustrating the voltage characteristic of converter 20 of FIG. 2, which is connected to capacitive circuit 25 of FIG. 3, and a curve 42 illustrating the linear regression of this characteristic.

It will be recalled that capacitive circuit 25 can provide successively five capacitance difference values $C1_i$–$C2_i$ (i=1, 2, 3, 4, 5). In the event that capacitive circuit 25 is used to simulate capacitive sensor 1 in the circuit of FIG. 2, five values for output voltage Vo can be obtained for the five respective capacitance difference values $Vo_i$ (i=1, 2, 3, 4, 5). In other words, five pairs of data items ($C1_i$–$C2_i$, $Vo_i$) are thus obtained.

In order to determine the electric performance of converter 20, as described hereinbefore, these five pairs of data items are then extrapolated by a linear regression which is show in FIG. 4a by curve 42. This regression allows gain As, and coefficient $L_{As}$ to be determined.

It will be noted in FIG. 4a that the measurement error in output voltage Vo is essentially due to the error $\epsilon$ in the effective value of the differences in capacitance $C1_i$–$C2_i$.

For a sensor such as described in relation to FIG. 1, this sensor can provide capacitance differences C1–C2 which are less than several tens of femtofarads (1 fF=$10^{-15}$F), over a range of variation in capacitance difference C1–C2 which is typically comprised between several picofarads and several tens of picofarads (1 pF–$10^{-12}$F). For example, a converter having a 12 bit resolution allows a variation of 2.4 fF to be measured for a variation range of 10 pF.

FIG. 4b shows a theoretical curve 43 illustrating a relative accuracy designated ΔVo/Vo, which is linked to output voltage Vo obtained from FIG. 4a, as a function of capacitance difference C1–C2. It will be noted in FIG. 4b that the measuring accuracy of the electric performance of converter 20, determined by such a characterisation procedure, is tainted by error ε which is typically of the order of 1%, this value having been established by the Applicant of the present invention, by considering capacitances whose tolerances are of the order of 1%. It will be noted that this error is higher the lower the measured capacitance difference.

In other words, such a characterisation procedure does not answer current requirements as to accuracy and yield, which are common industrial concerns, in particular in semiconductor manufacturing plants.

SUMMARY OF THE INVENTION

One object of the present invention is to provide a characterisation procedure for a voltage or current converter connected to a capacitive circuit, this procedure overcoming the aforementioned drawbacks of the prior art, in particular by allowing the converter voltage characteristic to be calculated accurately, in particular the electric performance thereof.

Another object of the present invention is to provide a characterisation procedure which answers current industrial concerns as to accuracy and yields, in particular in semiconductor manufacturing plants.

These objects, in addition to others, are achieved by the characterisation procedure according to claim 1.

One advantage of the characterisation procedure according to the present invention lies in the fact that it relies on the measurement of the converter output voltage, as a function of different bias voltage values, which allows the electric performance of the converter to be determined independently of the error due to the measurement of a capacitance. There results a procedure which is accurate and simple to implement in an industrial environment, in particular in the semi-conductor field.

BRIEF DESCRIPTION OF THE DRAWINGS

These objects, features and advantages, in addition to others, will appear more clearly upon reading the detailed description of a preferred embodiment of the invention, given solely by way of example, in relation to the annexed Figures, in which.

DETAILED DESCRIPTION OF THE INVENTION

The characterisation procedure according to the resent invention is intended to determine the characteristic of a voltage converter connected to a capacitive circuit.

Figure 2:
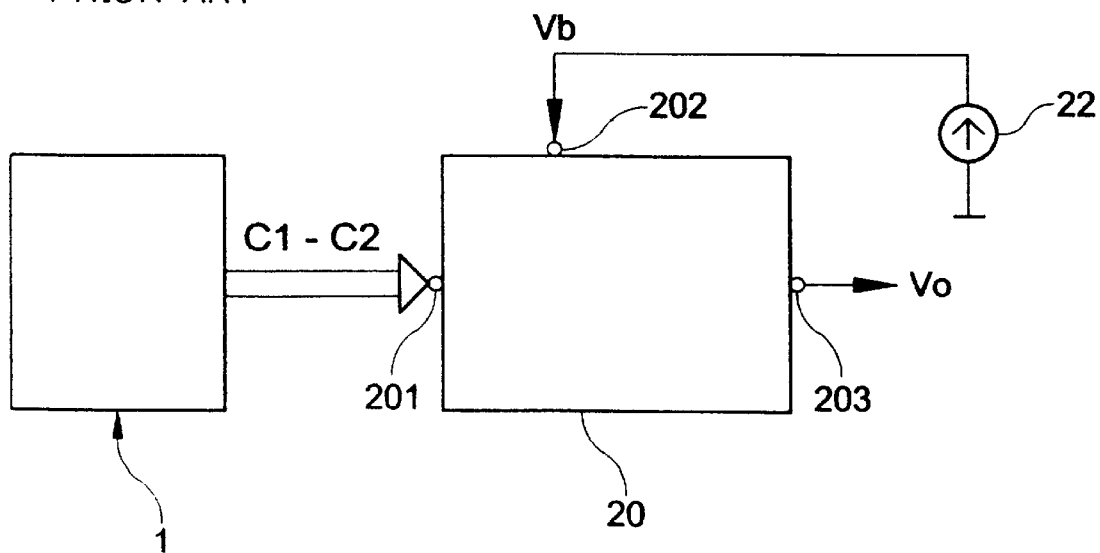
FIG. 2 which has already been cited, shows a circuit diagram including the sensor of FIG. 1, connected to a voltage converter, FIG. 3 which has already been cited shows a conventional capacitive circuit, FIG. 4a which has already been cited, shows two curves respectively illustrating the characteristic of a voltage converter, and the linear regression of such characteristic, according to a conventional characterisation procedure, FIG. 4b which has already been cited, shows a theoretical curve illustrating a relative accuracy linked to a voltage converter as a function of a capacitance difference, capable of being obtained from a conventional characterisation procedure.
Figure 3:
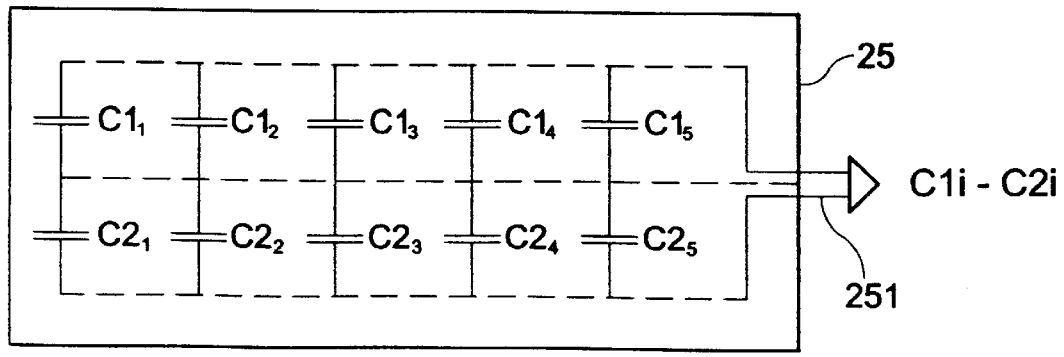
Figure 4A:
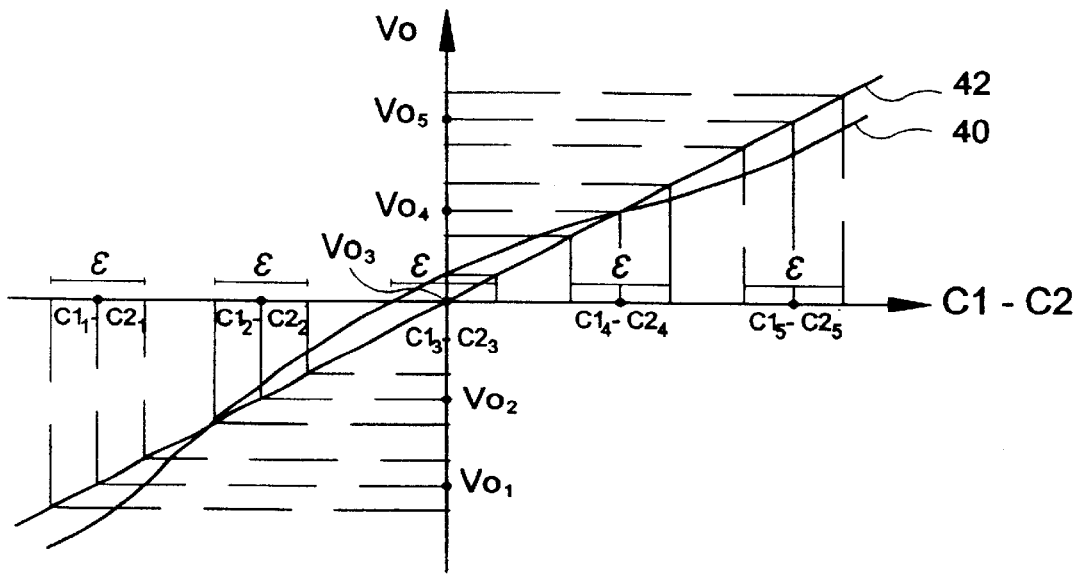
Figure 4B:
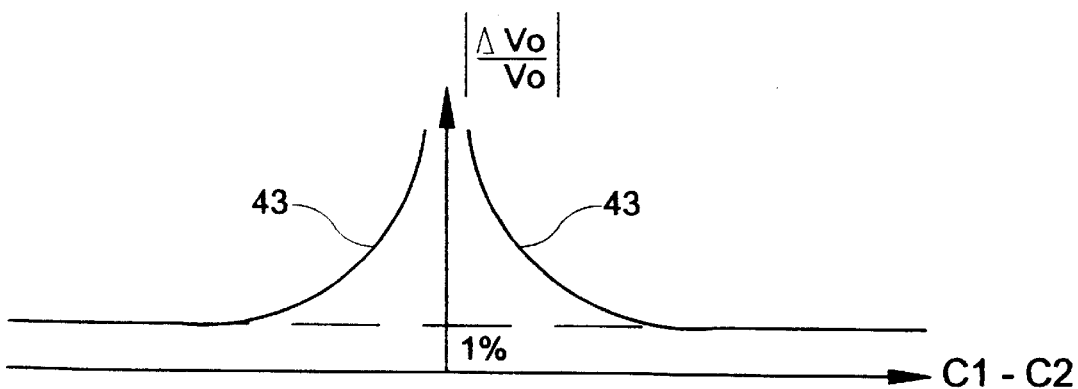
Figure 5:
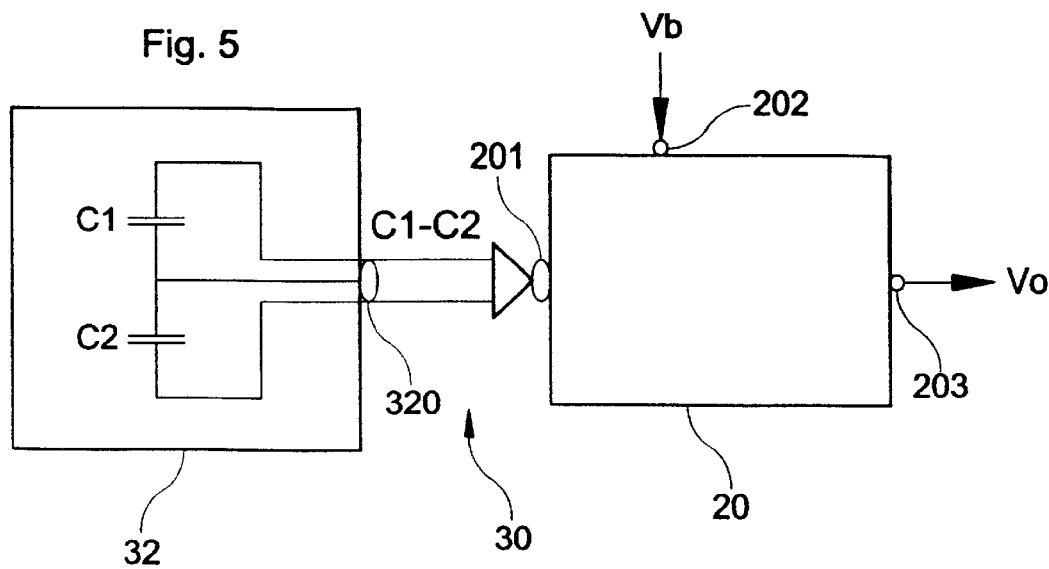
FIG. 5 shows a circuit diagram including a capacitive circuit, and a voltage converter to be characterised by the procedure according to the present invention.

By way of illustration only, FIG. 5 shows a circuit 30 including voltage converter 20 of FIG. 2, which is connected to a capacitive circuit 32, and intended to be characterised by the characterisation procedure according to the present invention.

It will be noted that FIG. 5 shows elements designated by references which are used to designate the elements described in relation to FIG. 2. The references used to designate elements in FIGS. 2 and 5, designate the same elements in the two Figures, in particular in relation to converter 20.

Figure 1:
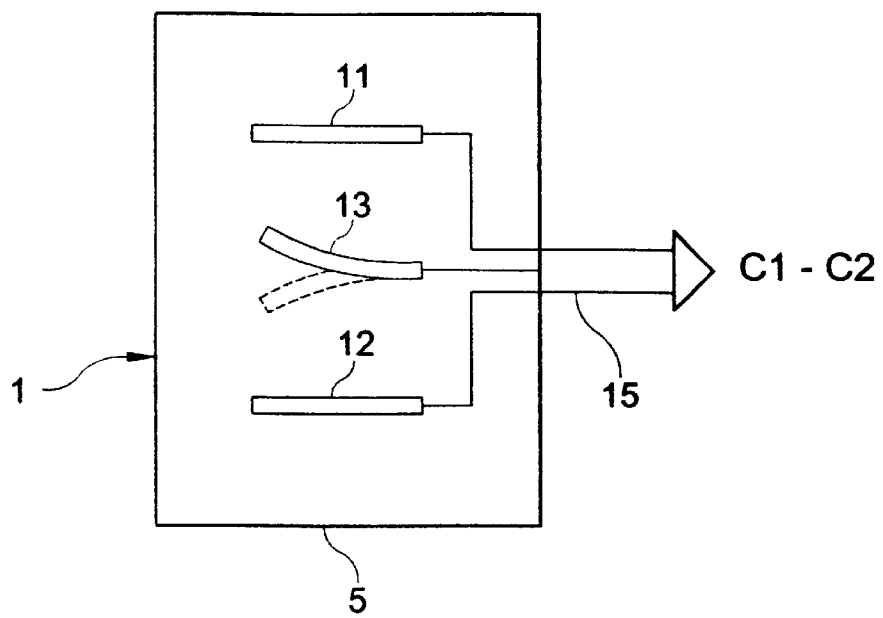
FIG. 1 which has already been cited, shows a conventional capacitive sensor.

Moreover, as FIG. 5 shows, capacitive circuit 32 includes a connecting terminal 320 connected to the input terminal 201 of converter 20. Capacitive circuit 32 has a structure as described hereinbefore. In other words, this circuit is formed of a circuit whose equivalent electric diagram is close to that of the sensor of FIG. 1, i.e. of two capacitances C1 and C2 connected in series. Thus, capacitive circuit 32 is arranged so as to provide, via terminal 320, a capacitance difference C1–C2 to converter 20.

It will be recalled that output voltage Vo of converter 20 is a function of capacitance difference C1–C2 and bias voltage Vb.

It will be noted that converter 20 receives, via terminal 202, bias voltage Vb which is provided by conventional supply means (not shown) arranged so as to be able to provide a variable value of bias voltage Vb.

The procedure according to the present invention will now be described, used to characterise converter 20 in circuit 30 of FIG. 5.

Figure 6:
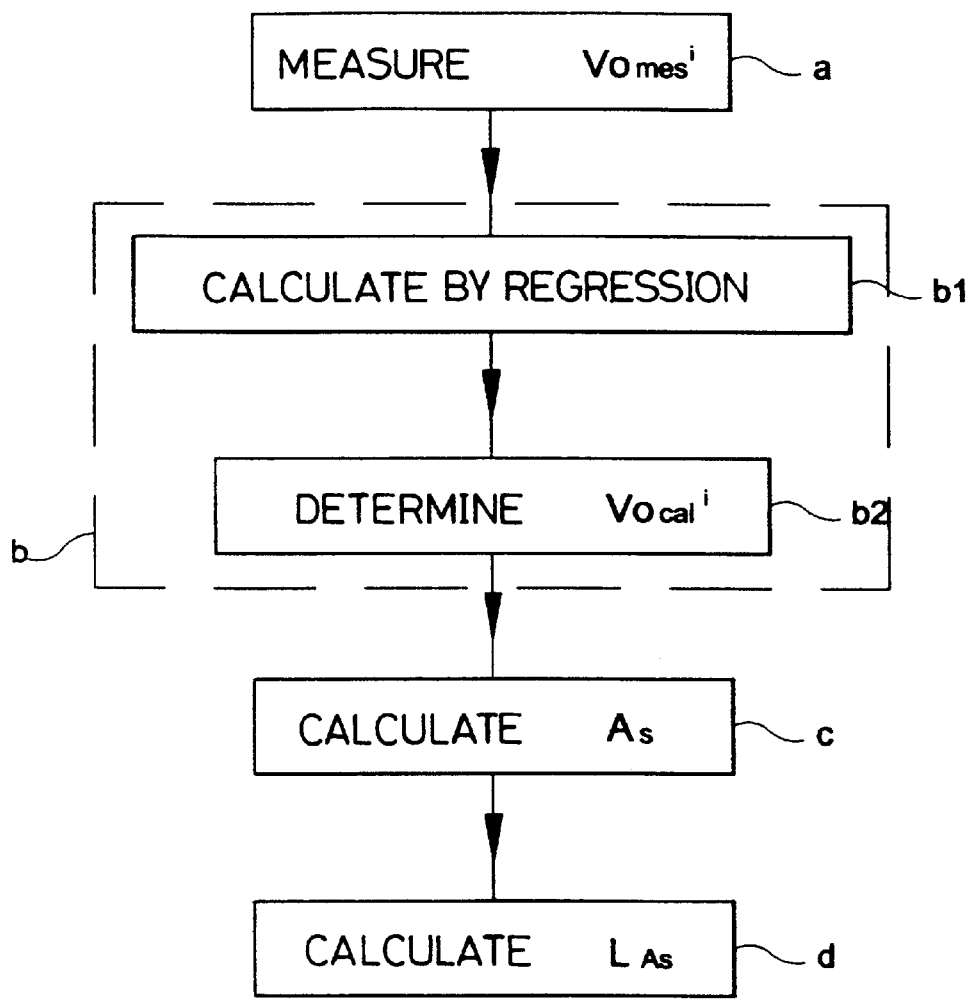
FIG. 6 shows a flow diagram of the characterisation procedure according to the present invention.

FIG. 6 shows a flow diagram of this procedure.

The procedure according to the present invention includes a sequence of steps designated <<a>> to <<d>>.

Step <<a>> consists in measuring at least three experimental values of output voltage Vo from at least three respective values of bias voltage Vb. It will be noted that capacitance difference C1–C2 is kept constant.

The references $Vo_{mes}^1$, $Vo_{mes}^2$ and $Vo_{mes}^3$ designate respectively the three experimental values of output voltage Vo, and the references $Vb_1$, $Vb_2$ and $Vb_3$ designate respectively the three values of bias voltage Vb. It will be noted that values $Vb_1$, $Vb_2$ and $Vb_3$ are comprised within the operating range of converter 31.

At the end of step <<a>>, three pairs of values are thus obtained $(Vb_1, Vo_{mes}^1)$, $(Vb_2, Vo_{mes}^2)$, $(Vb_3, Vo_{mes}^3)$.

Step <<a>> is followed by step <<b>>, which includes two sub-steps designated <<b1>> and<<b2>>.

Sub-step <<b1>> consists in determining by regression an analytical curve from the three pairs of values $(Vb_1, Vo_{mes}^1)$, $(Vb_2, Vo_{mes}^2)$, $(Vb_3, Vo_{mes}^3)$. The curve obtained is an analytical representation of the voltage characteristic of converter 20, based on an analytical model which depends on the nature of the capacitive circuit, as will be described in more detail hereinafter.

It will be noted that the procedure according to the present invention is particularly advantageous, since it allows the characteristic of converter 20 to be determined from values $Vb_1$, $Vb_2$ and $Vb_3$ of bias voltage Vb, unlike the conventional procedure. Indeed, during the conventional procedure, the characteristic of converter 20 is determined from capacitance difference values $C1_i$–$C2_i$, for i=1, 2, 3, 4, 5, the value of bias voltage vb being kept constant. Consequently, the accuracy of measurement in the characterisation procedure according to the present invention is typically of the order of 1 mV, which allows a capacitance difference of 10 pF to be measured with an accuracy of 2 fF (1 fF=$10^{-15}$ F), for a bias voltage Vb equal to 5 V for example.

Sub-step <<b1>> is followed by sub-step <<b2>> which consists in providing, from the analytical representation obtained in sub-step <<b1>>, and values $Vb_1$, $Vb_2$ and $Vb_3$, three values calculated from output voltage Vo, which are respectively designated $Vo_{cal}^1$, $Vo_{cal}^2$ and $Vo_{cal}^3$, and which correspond respectively to the three experimental values $Vo_{mes}^1$, $Vo_{mes}^2$ and $Vo_{mes}^3$.

Within the framework of determining the electric performance of converter 20, as described hereinbefore, sub-step <<b2>> is followed by step <<c>> which is intended to determine gain As of converter 20, then step <<d>> which is intended to determine coefficient $L_{As}$ of the converter.

Thus step <<c>> consists in determining, from the previously measured experimental values $Vo_{mes}^1$, $Vo_{mes}^2$ and $Vo_{mes}^3$ and the respective calculated values $Vo_{cal}^1$, $Vo_{cal}^2$ and $Vo_{cal}^3$, the converter gain As., by performing the following calculation, for i, j=1, 2, 3 and i≠j:

$$As = \frac{Vo_{cal}^i - Vo_{cal}^j}{Vb_i - Vb_j}$$

It will be noted that this gain is calculated with the accuracy of measurement relating to bias voltage Vb.

Step <<c>> is followed by step <<d>> which consists in determining, from the previously measured experimental values $(Vo_{mes}^1, Vo_{mes}^2, Vo_{mes}^3)$, and the respective calculated values $(Vo_{cal}^1, Vo_{cal}^2, Vo_{cal}^3)$, the converter non-linearity coefficient $L_{As}$ by performing the following calculation:

$$L_{As} = \text{Max}_{i,j}\left(\frac{Vo_{mes}^i - Vo_{mes}^j}{Vo_{max} - Vo_{min}}\right)$$

where $Vo_{max}$–$Vo_{min}$ corresponds to the length of the range of variations in the output signal.

It will be noted that coefficient $L_{As}$ is calculated with the accuracy of measurement relative to bias voltage Vb.

As was already mentioned hereinbefore, the curve obtained at the end of step <<b1>> is an analytical representation of the voltage characteristic of converter 20, based on an analytical model which depends on the nature of capacitive circuit 32. The following two types of capacitive circuits will be considered.

Let us consider the first type of capacitive circuit which has a structure whose equivalent electric diagram includes a capacitance C1 which is fixed, and a capacitance C2 which is variable. In this case, the regression used in step <<b1>> is polynomial.

Let us now consider the second type of capacitive circuit which has a structure whose equivalent electric diagram includes two capacitances C1 and C2 the sum of which is fixed. In this case, the regression used in step <<b1>> is linear.

Figure 7A:
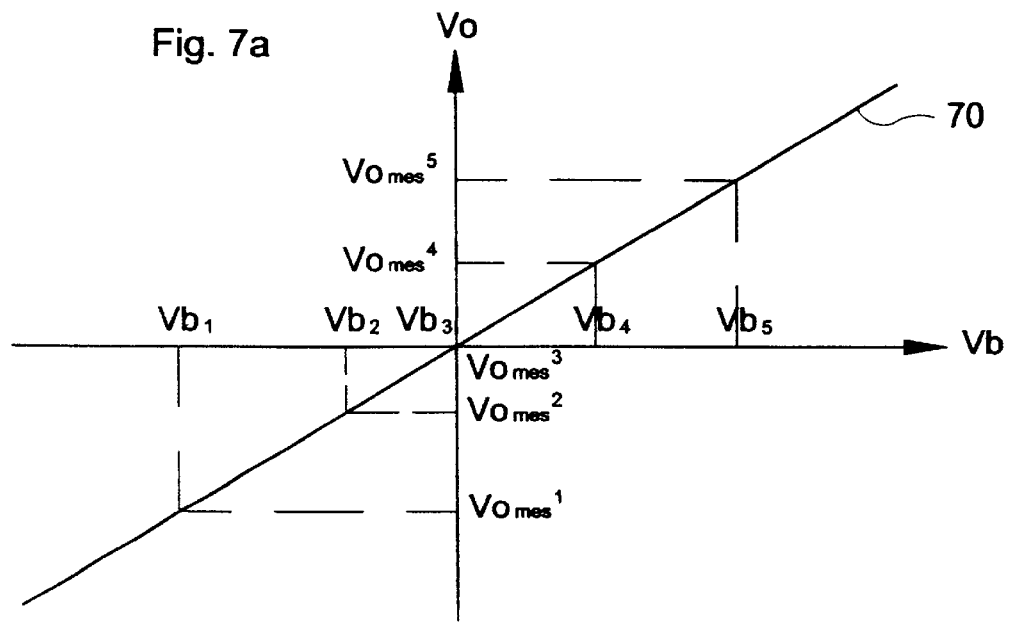
FIG. 7a shows two curves illustrating respectively the voltage characteristic of a converter, and the linear regression of such characteristic according to the characterisation procedure of FIG. 6.

By way of illustration only, FIG. 7a shows a curve 70 illustrating the linear regression of the voltage characteristic of a voltage converter, in the event that the latter is connected to a capacitive circuit of the second type.

Five pairs of data are thus shown in FIG. 7a, and designated by the references $(Vb_i, Vo_{mes}^1)$ for i=1, 2, 3, 4, 5. These pairs of data have been extrapolated by the linear regression illustrated by curve 70, to determined gain As and coefficient $L_{as}$.

Figure 7B:
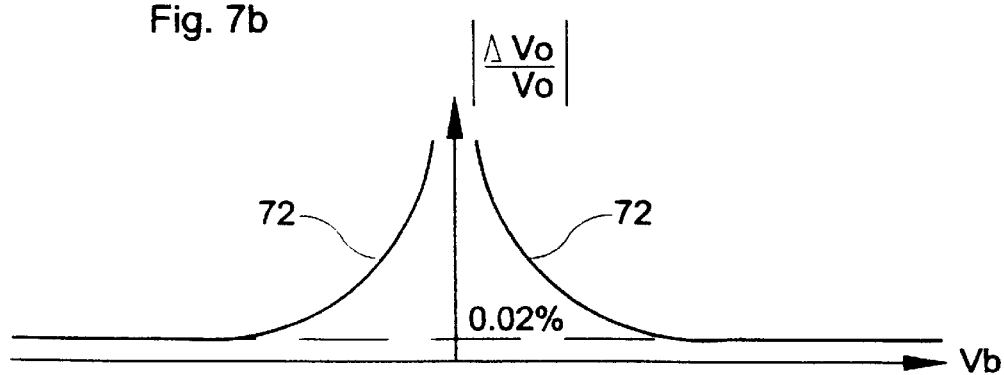
FIG. 7b shows a theoretical curve illustrating a relative accuracy linked to a voltage converter, as a function of a voltage, capable of being obtained from the characterisation procedure according to the present invention.

It will be noted in FIG. 7b that the measurement error in output voltage Vo is essentially due to the error in the effective value of bias voltage vb.

FIG. 7b shows a theoretical curve 72 illustrating a relative accuracy designated ΔVo/Vo, which is linked to output voltage Vo described in relation to FIG. 7a, as a function of bias voltage Vb. It will be noted in FIG. 7b that the accuracy of measurement of the electric performance of the converter, determined by such a characterisation procedure, is tainted by an error which is typically of the order of 0.02%, this value having been established by the Applicant of the present invention.

It goes without saying for those skilled in the art that the detailed description hereinbefore can undergo various modifications without departing from the scope of the present invention. By way of example, the characterisation procedure according to the present invention can be used to determine the characteristic of a current converter. Also by way of alternative, the bias voltage can be replaced by a bias current.

What is claimed is:

1. A process for determining a characteristic of a voltage or current converter intended to be connected to a capacitive circuit providing a capacitance difference to the converter, the converter being arranged to receive the capacitance difference and an electric bias voltage or current, and to provide an output voltage or current which is a function dependent on the capacitance difference and the bias voltage or current, said process comprising the following sequence of steps:

varying the bias voltage or current provided to said converter, while keeping constant the capacitance difference; and then measuring the output voltage or current in order to determine the converter characteristic illustrating a function between the converter output voltage or current, the capacitance difference and the bias voltage or current.

2. The process according to claim 1, wherein the sequence of steps further comprises the following first and second steps:

measuring at least three experimental values of the output voltage or current according to at least three respective values of the bias voltage or current provided to said converter, said values being within an operating range of the converter; and determining by regression an analytical curve from previously measured experimental points, said curve corresponding to the converter characteristic, and then providing three calculated output voltage or current values corresponding respectively to the measured experimental values.

3. The process according to claim 2, further comprising a third step which consists of determining, according to a previously measured experimental values $Vo_{mes}$ of output voltage produced by a values of bias voltage Vb and by a respective calculated values $Vo_{cal}$ of output voltage, a gain As of the converter by performing the following calculation, for i,j=1, 2, 3 and i≠j:

$$As = \frac{Vo_{cal}^i - Vo_{cal}^j}{Vb_i - Vb_j}$$

said being calculated with an accuracy of measurement relating to the bias voltage.

4. The process according to claim 3, further including a fourth step which consists of determining, according to the previously measured experimental values $Vo_{mes}$ of output voltage produced by the values of bias voltage Vb, and to the respective calculated values $Vo_{cal}$ of output voltage, a converter nonlinearity coefficient $L_{as}$ by performing the following calculation for i,j=1, 2, 3 and i≠j:

$$L_{as} = \text{Max}_{i,j}\left(\frac{Vo_{mes}^i - Vo_{mes}^j}{Vo_{max} - Vo_{min}}\right)$$

where $Vo_{max} - Vo_{min}$ corresponds to a length of a range of variations in the output voltage, said coefficient being calculated with an accuracy of measurement relating to the bias voltage.

5. The process according to claim 2, wherein the capacitive circuit is formed of a capacitive sensor, wherein said sensor has a fixed first capacitance and a variable second capacitance in order to provide a capacitance difference to said converter according to a sensed parameter, and wherein the regression is polynomial.

6. The process according to claim 2, wherein the capacitive circuit is formed of a capacitive sensor, wherein said sensor has first and second capacitances (C1, C2), the sum of which is fixed, and wherein the regression is linear.

* * * * *